Apr. 24, 1923.
C. P. RUPPE
1,453,188
DETACHABLE HANDLE
Filed June 3, 1921
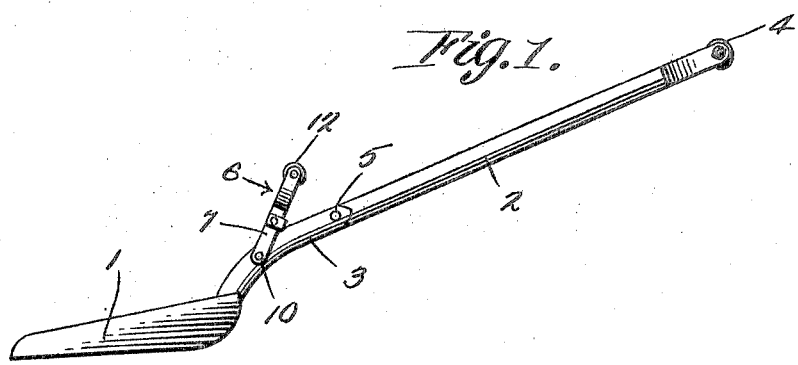
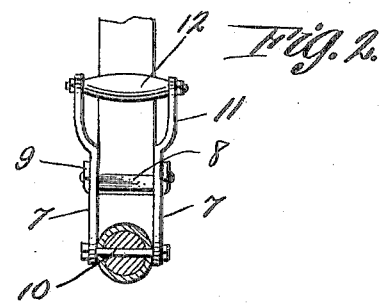
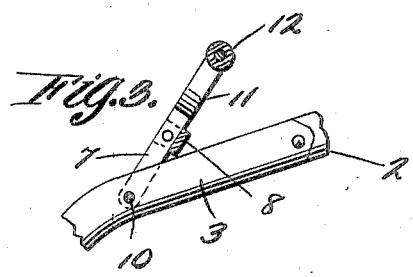
CECIL P. RUPPE *INVENTOR.*
BY Richard B. Owen *ATTORNEY.*
WITNESSES Patented Apr. 24, 1923.

1,453,188

UNITED STATES PATENT OFFICE.

CECIL P. RUPPE, OF OAKLEY, KANSAS.

DETACHABLE HANDLE.

Application filed June 3, 1921. Serial No. 474,656.

*To all whom it may concern:*

Be it known that I, CECIL P. RUPPE, a citizen of the United States, residing at Oakley, in the county of Logan and State of Kansas, have invented certain new and useful Improvements in Detachable Handles, of which the following is a specification.

This invention relates to new and useful improvements in handles for scoops.

An important object of the invention is to provide a scoop such as a shovel, pitch-fork or the like with an auxiliary handle or grip located adjacent to the outer implement end of the handle thereof to facilitate the handling of the scoop to render working therewith less laborious.

Another object of the invention is to provide a pivoted handle or grip for the ordinary handle of a scoop or the like and means for limiting the pivoted movement of the grip.

Other objects and advantages of the invention will become apparent in the course of the following description.

In the accompanying drawing forming a part of the application and wherein like numerals are employed to designate like parts throughout the several views, Figure 1 is a side elevation of a shovel with my invention applied thereto.

Figure 2 is a plan of the invention associated with the shovel and

Figure 3 is a longitudinal section of the same.

Referring now more particularly to the drawing wherein for the purpose of illustration is shown a preferred embodiment of my invention, numeral 1 designates, in the present instance, the scoop or shovel, or the implement may be a pitch-fork or any other kind of implement used for lifting material. The well known type of handle 2 is adapted to the rear end of the scoop in any desired manner but I prefer to fasten the handle to the scoop by fitting the outer end of the handle in a sleeve 3 projecting from the rear end of the scoop. The free inner end of the handle 2 is of course provided with the well known type of transverse grip 4.

Ordinarily when the sleeve 3 is employed for securing the handle to the scoop, a plurality of rivets 5 are passed through the sleeve and outer end of the handle. I have therefore taken advantage of this construction for fastening my auxiliary handle or grip 6 to the scoop so that the grip may be secured whenever desired.

This auxiliary handle consists of a pair of spaced side members 7 which are retained in spaced relation by means of a transversely extending strip 8 having its free ends 9 angularly disposed and fastened to the outer faces of the side members by means of rivets or any other suitable fastener. It is to be particularly noted that the grip 8 is adapted to lie across or engage the relative inner longitudinal edges of the side members. A bolt 10 is extended through corresponding apertured ends of the side members 7 and is adapted to be extended through the openings in the sleeve 3 and handle 2 provided for the reception of one of the bolts or rivets 5 for fastening the handle 2 to the scoop. Consequently, it will be manifest that when the use of the auxiliary handle is not desired it may be removed from the sleeve 3 and a fastening element passed through the opening left by one of the rivets. The free ends 11 of the side members are offset so as to increase the space therebetween and are connected at their extremities by a transversely extending hand grip 12. This grip may be fastened to the free end of the side members in any desired manner but is preferably rotatably mounted upon a bolt, the opposite ends of which are extended through the ends of the side members 11 in the well known manner.

From the foregoing description, it will be obvious that the auxiliary handle is disposed adjacent to the outer implement end of the handle 2 and the grip 12 thereof is arranged transversely of the handle 2 and prevented from engaging the same by the strip 8 abutting the sleeve 3. However, the forward pivotal movement of the auxiliary handle is not restricted. By the use of the auxiliary handle in conjunction with the handle of the scoop and the like, it will be obvious that the strains and exertions of the muscle in the arms incident to work with the old form of handle will be eliminated since all strain is shifted to the shoulders of the workmen. Furthermore, it will be seen that the lifting of the scoop will be made easier by positioning the auxiliary handle adjacent the outer implement end of the handle 2.

The foregoing description and the drawings have reference to the preferred or approved embodiment of my invention. It is to be understood however, that such changes may be made in construction and operation of parts, materials, dimensions, etc., as may prove expedient and fall within the scope of the appended claim.

Having fully described my invention what I claim as new and desire to secure by Letters Patent, is:

A scoop having a handle, auxiliary handle comprising a pair of spaced side members, means for pivotally connecting the auxiliary handle to the handle of the scoop, a grip for the auxiliary handle, and a strip connected to the spaced side members and engaging the longitudinal edges thereof and adapted for abutment with the scoop handle to limit the pivotal movement of the auxiliary handle.

In testimony whereof I affix my signature in presence of two witnesses.

CECIL P. RUPPE.

Witnesses:
J. B. RUPPE,
E. A. RUPPE.